(62.)

E. E. EVERITT.

Improvement in Spring Bed Bottoms.

No. 4,713. Reissued Jan. 16, 1872.

INVENTOR

Henry F. Nover, Assignee of Elisha E. Everitt by Francis D. Castorius his Atty in fact

WITNESSES

Chas. Schlomerline

Frank. Pe Evans

AM. PHOTO-LITHOGRAPHIC CO. N.Y. (OSBORNE'S PROCESS.)

UNITED STATES PATENT OFFICE.

ELISHA E. EVERITT, OF PHILADELPHIA, PENNSYLVANIA, ASSIGNOR TO HENRY F. HOVER, OF SAME PLACE.

IMPROVEMENT IN SPRING BED-BOTTOMS.

Specification forming part of Letters Patent No. 69,198, dated September 24, 1867; reissue No. 4,713, dated January 16, 1872.

Specification describing an Improved Spring-Bottom for Bedsteads, invented by ELISHA E. EVERITT, of the city and county of Philadelphia and State of Pennsylvania.

The invention consists of certain improvements in that class of spring-bottoms for bedsteads, composed of elastic wooden slats, carried at each end on springs attached to the transverse bars of the bedsteads.

Figure 1:
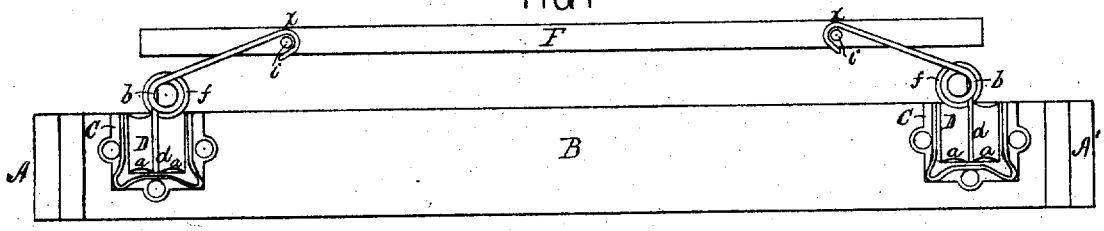
Figure 2:
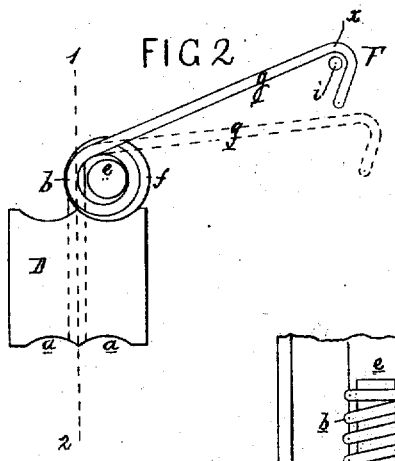
Figure 3:
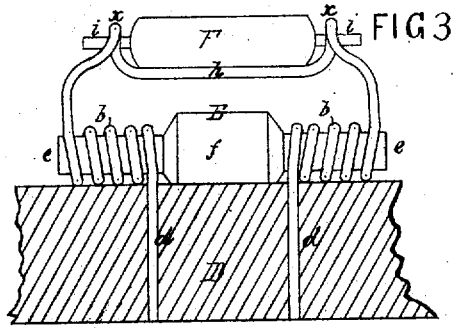
Figure 4:
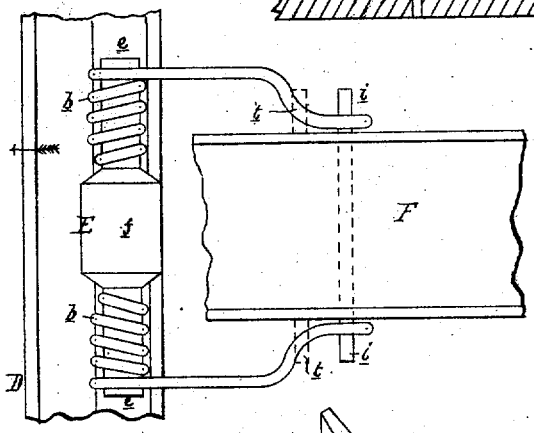
Figure 5:
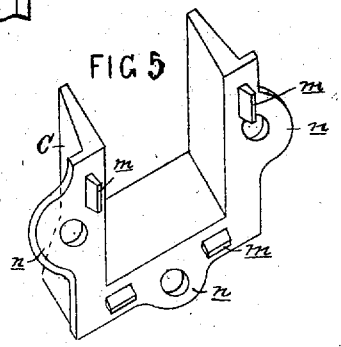
Figure 6:
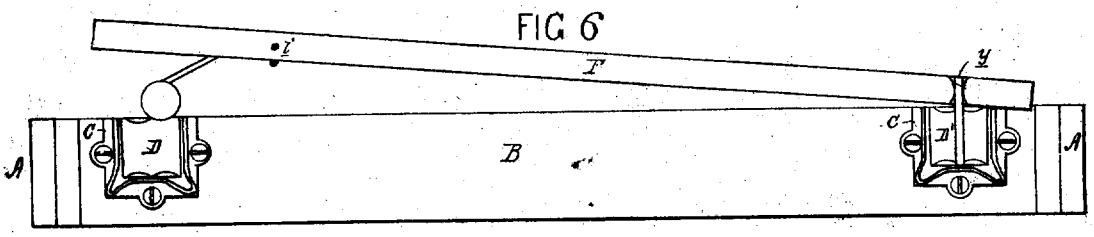

Figure 1 is a vertical section of the frame of the bedstead with improvements. Fig. 2 is an enlarged view of part of Fig. 1. Fig. 3 is a section on the line 1 2, Fig. 2. Fig. 4 is a plan view. Fig. 5 is a perspective view of one of the sockets for receiving the ends of the transverse bars. Fig. 6 is a modification of the improvement.

A and A′ represent the end bars, and B one of the side bars of a bedstead; and to the inside of the said side bars are secured the cast-iron sockets C, Fig. 5, for receiving the ends of the transverse bars D, each of which has, both on its upper and under edge, longitudinal concave grooves *a*, adapted to the enlarged portions *f* of a series of pins, E. Round each reduced projection *e* of each pin is coiled the portion *b* of a wire spring, the termination of each coil being the straight length or end *d*, which fits snugly in but so as to be easily withdrawn from a hole in the transverse bar D. From the two coils the wires take an inclined direction, as shown at *g*, Fig. 2, and are united by and form a part of the transverse portion *h* of the wire, on which rests the slat F. Pins *i i* pass transversely through the ends and project beyond the sides of the slat F, and take in the hook, Fig. 2, formed at the bend *x*, where the inclined portion *g* of the wires meet the horizontal portion *h*. The projections *e* of the pins E are so much smaller than the portion *f* that coiled parts *b* of the wire spring are free from contact with the groove of the transverse bar D; hence the friction of spring against the bar and the creaking noise accompanying such friction are prevented. By the pressure of the slats against the springs the transverse bars are apt to become warped by being bent outward in the direction of the arrow, Fig. 4, or downward. A quick remedy is afforded for this by withdrawing the straight portions *d d* of the springs from the bars and reversing the same or turning them upside down, according to the direction in which they have been warped by the above-mentioned pressure on the slats. The enlarged portions *f* of the pins fit snugly in any of the grooves of transverse bars. In Fig. 1 the slats rest on and are confined to springs at both ends, but in Fig. 6 the ends of the slats adjacent to the lower end or foot of the beadstead fit over pins *y* on the transverse bar D′ on which the slats rest. This is a somewhat cheaper application of the invention than that shown in Fig. 1, and may be adopted in cases where most elasticity is required at and near the head of the bed. The cast-iron sockets used for receiving the ends of the transverse bars will be readily understood on reference to Fig. 5, the back of each socket being provided with wedge-shaped projections *m*, which penetrate the wood when the socket is driven against the inside of the longitudinal bar of the bedstead, and serve to resist the strain imparted to the transverse slats, the sockets being further secured by light wood-screws passing through lugs *n n*.

It will be readily seen that the slats are at liberty to slide freely to and fro on the transverse piece *h* of the wire spring, as it yields. The pins *i i* of each slat permit an independent motion of the same; they also allow of the slats being separately detached for repairs or for turning when they belly by too constant use in one position. Owing to the peculiar formation of the springs the slats F can be readily put in their places, where they are retained vertically by the pins *i i* and laterally by the straps or yokes *x*.

If the pins *i i*, instead of being attached to each individual slat, were to pass through all the slats, thereby having but two pins for an entire bed-bottom, the free and easy yielding of the bottom would be entirely destroyed. Separate distinct pins *i i* for each separate distinct slat constitute a very essential element of the invention.

I claim as the invention of ELISHA E. EVERITT—

1. A spring-bottom for bedsteads, in which each slat has independent separate retaining-pins *i i*, substantially for the purpose shown and described.

2. The transverse bars D, having one or more grooves, in combination with the pin E, arranged to receive the coils of the spring and to fit the said groove, all substantially as set forth.

3. The within-described spring, having ends *d d* fitting into the transverse bars D, and being bent and arranged for the reception of the slats and pins *i i*, substantially as set forth.

4. The slats, connected at one end to the within-described springs on the transverse bar D, and resting at the opposite end on the transverse bar D′, to which it is confined by a pin, *y*, all as set forth.

In testimony I, the assignee of ELISHA E. EVERITT, do hereby sign my name in presence of two subscribing witnesses.

HENRY F. HOVER.

Witnesses at signing:

FRANCIS D. PASTORIUS,

G. HAHN. (62)